US006709223B2

(12) United States Patent
Walto et al.

(10) Patent No.: US 6,709,223 B2
(45) Date of Patent: Mar. 23, 2004

(54) TRACKED COMPACT UTILITY LOADER

(75) Inventors: Joseph J. Walto, Carver, MN (US); Ronald T. Keagle, Spring Park, MN (US); Philip G. Stalpes, Hamel, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/254,047

(22) Filed: Sep. 24, 2002

(65) Prior Publication Data

US 2003/0108414 A1 Jun. 12, 2003

Related U.S. Application Data (63) Continuation of application No. 09/560,308, filed on Apr. 27, 2000, now abandoned.

(51) Int. Cl.⁷ .................................................. E02F 3/00
(52) U.S. Cl. ...................................... 414/685; 180/19.1
(58) Field of Search ................................. 414/680, 685, 414/686; 305/151, 152, 154, 156; 180/19.1, 19.3

(56) References Cited

U.S. PATENT DOCUMENTS

| | | | | | |
|---|---|---|---|---|---|
| 2,284,821 A | * | 6/1942 | Heaslet | .................... | 305/154 X |
| 2,717,813 A | * | 9/1955 | Gardner | .................... | 305/154 X |
| 3,409,335 A | * | 11/1968 | Piepho et al. | ........... | 305/154 X |
| D359,497 S | * | 6/1995 | Rayner | ........................ | D15/10 |
| 5,423,654 A | * | 6/1995 | Rohrbaugh | ................. | 414/686 |

FOREIGN PATENT DOCUMENTS

SE             112080      * 10/1944     ................. 305/152

OTHER PUBLICATIONS

Maximan brochure, 1 pg. (undated).
Maximan Track Loader System brochure, 6 pgs. (undated).
Maximan Track Loader System Price List, Mar. 01, 2000.
South Florida Truck and Equipment Auction web page, referring to '99 Maximan walk behind skid loader w/attachments.

* cited by examiner

*Primary Examiner*—Donald W. Underwood
(74) *Attorney, Agent, or Firm*—James W. Miller (57) ABSTRACT

This invention relates to an outdoor equipment unit such as a walk-behind skid steer loader. The loader has a tracked traction system in which endless tracks are entrained around a rear drive support member and a front support member. The front support member is spring biased forwardly, but can move rearwardly against the spring bias to allow debris that is caught between the front support member to clear itself to help prevent the track from un-tracking. A single control handle having front and rear hand grips located between a fixed grab bar can be rotated and/or twisted to control the traction system. Return to neutral systems ensure that the control handle will return to a centered, neutral position upon release of the control handle by the operator.

14 Claims, 10 Drawing Sheets

TRACKED COMPACT UTILITY LOADER

This application is a continuation of Ser. No. 09/560,308 filed on Apr. 27, 2000, now abandoned.

TECHNICAL FIELD

This invention relates to a compact utility loader which has a traction system and is guided by an operator who walks behind the loader. More particularly, this invention relates to a tracked traction system particularly adapted for use in outdoor, relatively hostile, debris laden environments.

BACKGROUND OF THE INVENTION

U.S. Pat. No. 5,423,654 to Rohrbaugh discloses a tracked, walk-behind loader for use in the coal mining industry. The loader includes a rotary turntable which mounts an extensible boom. An attachment, such as a bucket, is pivotally mounted on the front of the boom. The boom can be swung about a vertical axis by virtue of the turntable. In addition, the boom can be pivoted about a horizontal axis to vary its angle of inclination relative to the ground, the boom can be telescoped and retracted to vary the boom's length, and the attachment on the front of the boom can be tilted relative to the boom.

The use of a tracked traction system on the Rohrbaugh loader provides good traction in hostile environments, such as those found in the coal mining industry or in ground grooming or working applications. However, in such environments, the Applicants have found that rocks, pieces of dirt, and miscellaneous other pieces of debris often get caught between the tracks and the rotatable track support members. For example, when operating a tracked loader in an outdoor environment in which dirt is being moved, such as when an area of ground is being graded, this debris often gets wedged between the front track support member and the track.

When debris gets wedged between the track and the track support members, various damage and/or operational difficulties often occur. For example, the debris can cause the track to jam which, in turn, can cause the track or other components of the traction system to break. In addition, the track can also become detracked, namely to be pushed off one or both of the track support members, thereby disabling the traction system and the loader. As a result, the traction system must be repaired if damage has occurred or, at a minimum, time and effort must be expended to properly re-install the track if the track has become detracked.

Obviously, these disadvantages detract from the use of a tracked loader in outdoor environments that contain various pieces of debris. There is a need in the art for a tracked loader which is more reliable and which has some ability for clearing itself of debris that would otherwise get wedged or caught between the tracks and the track support members.

Another problem with the Rohrbaugh loader is the use of an extensible and retractable boom to mount the ground engaging attachment. This boom is so large and is so positioned on the loader that it substantially obstructs the view of the operator if the operator is attempting to work the ground immediately in advance of the loader. The operator simply cannot see what he is doing with the attachment when using the Rohrbaugh loader. Moreover, using a rotatable turntable to mount the boom further complicates the structure and provides a loader which, while versatile, has more components and drive systems that are susceptible to breaking down. Thus, there is also a need in the art for a tracked, walk-behind loader that provides the operator with good sight lines to the attachment secured to the loader and which is as simple and durable as possible.

SUMMARY OF THE INVENTION

One aspect of this invention relates to an outdoor maintenance equipment unit which comprises a frame. A ground grooming or ground working attachment is carried on the frame. A source of power is carried on the frame. A traction system is carried on the frame for propelling the frame in forward and reverse directions, the traction system being powered by the power source. The traction system comprises left and right endless drive tracks carried on the frame. Each drive track is entrained around rotatable front and rear support members. The front support member of each drive track is yieldably carried on the frame to be able to move towards the rear support member during operation of the traction system.

Another aspect of this invention relates to an outdoor maintenance equipment unit which comprises a frame having a front and a rear and a pair of laterally spaced uprights at the rear of the frame. A source of power is carried on the frame. A traction system is carried on the frame for propelling the frame in forward and reverse directions. The traction system is powered by the power source. Left and right loader arms are pivotally connected to the upper ends of the uprights. The loader arms slope downwardly from the uprights to terminate in front ends that extend over the front of the frame. A ground grooming or working attachment is pivotally connected to the front ends of the loader arms. At least one actuator extends between the loader arms and the frame for pivoting the loader arms upwardly and downwardly relative to the frame about the pivotal connection of the loader arms to the frame. At least one actuator extends between the loader arms and the attachment for pivoting the attachment relative to the loader arms. A control system is positioned at the rear of the frame and comprises a control handle configured to be gripped and manipulated by a standing operator walking behind the frame.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

This invention relates to an outdoor equipment unit for performing ground grooming or ground working operations. More particularly, one embodiment of this invention relates to an outdoor equipment unit comprising a compact utility loader 2. Loader 2 of this invention has a tracked traction system for propelling loader 2 over the ground.

Loader 2 can be used by landscape contractors to perform various ground working operations when constructing or creating a desired landscape. For example, a bucket can be attached to loader 2 for scooping and carrying dirt, a ground leveling plane can be attached to loader 2 for blading and leveling the ground surface, a trencher can be attached to loader 2 for cutting a trench in the ground, etc. In addition, loader 2 can perform various ground grooming operations. For example, loader 2 can be used by maintenance personnel to remove snow when a snow plowing blade is attached thereto.

Referring first to FIGS. 1–4, loader 2 includes a suitably shaped frame 4 on which a power source, such as an internal combustion engine (not shown) is carried. A gas tank cap 6 is accessible from the exterior of loader 2 and closes the fuel inlet pipe 7 when cap 6 is in place. A hood or shroud 8 encloses and covers the engine.

Loader frame 4 includes laterally spaced uprights 10 at the rear of frame 4. Left and right loader arms 12 are pivotally connected to the upper ends of uprights 10 and slope downwardly therefrom over the front of loader 2. Hydraulic cylinders 14 are connected between loader frame 4 and loader arms 12. When the piston rods of hydraulic cylinders 14 are extended, loader arms 12 pivot about their pivotal connection to uprights 10 to raise or lift loader arms 12 relative to the ground. When the piston rods of the hydraulic cylinders 14 are retracted, loader arms 12 pivot in the opposite direction to lower relative to the ground.

Figure 1:
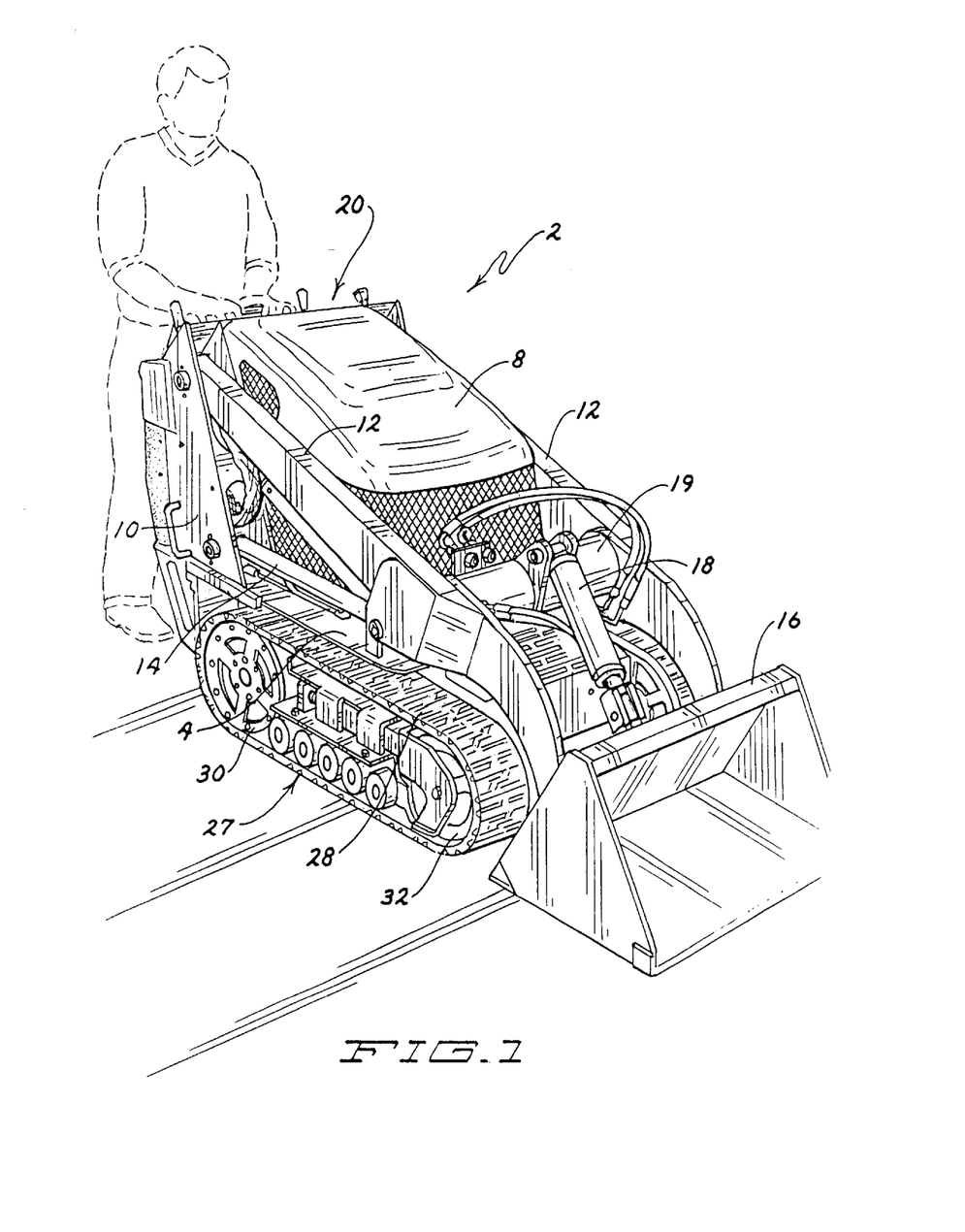
FIG. 1 is a perspective view of a tracked, walk-behind loader according to this invention.
Figure 2:
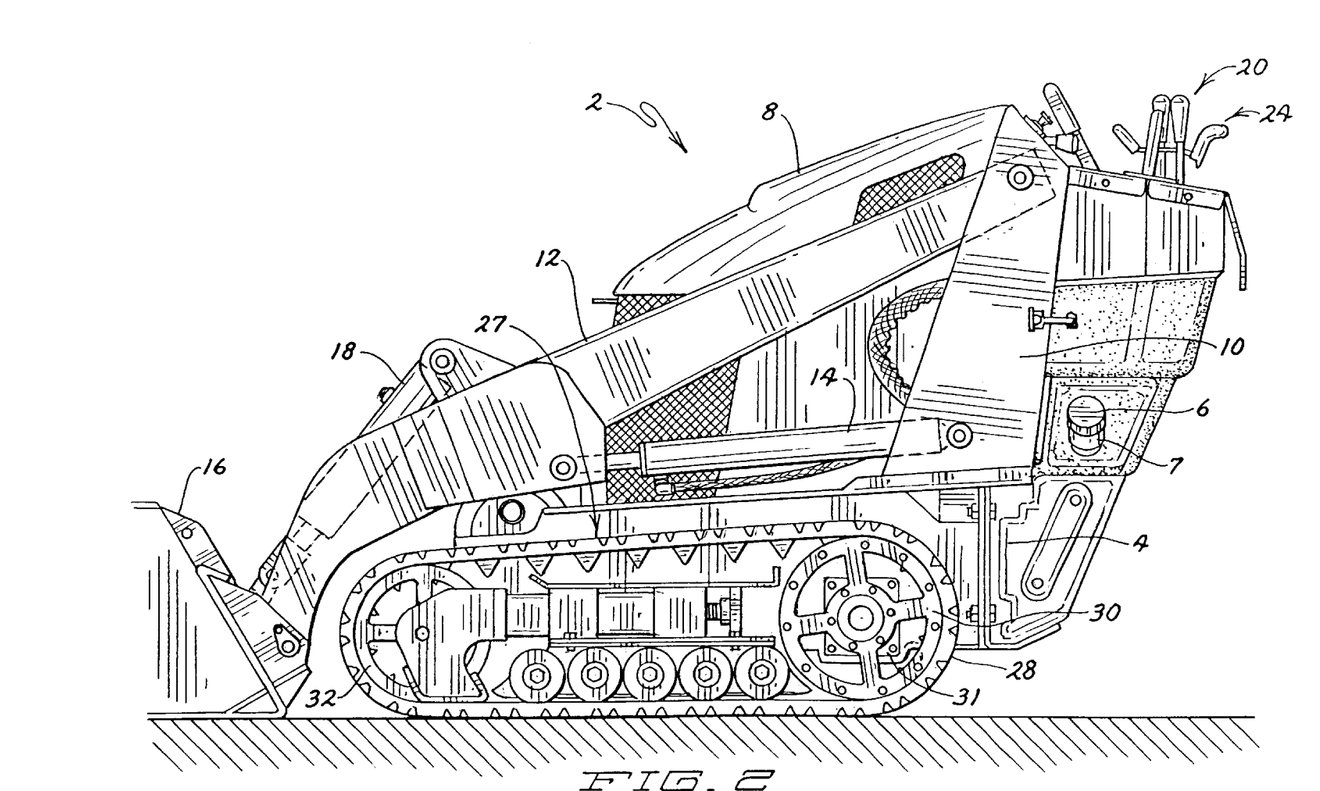
FIG. 2 is a side elevational view of the loader of FIG. 1.
Figure 3:
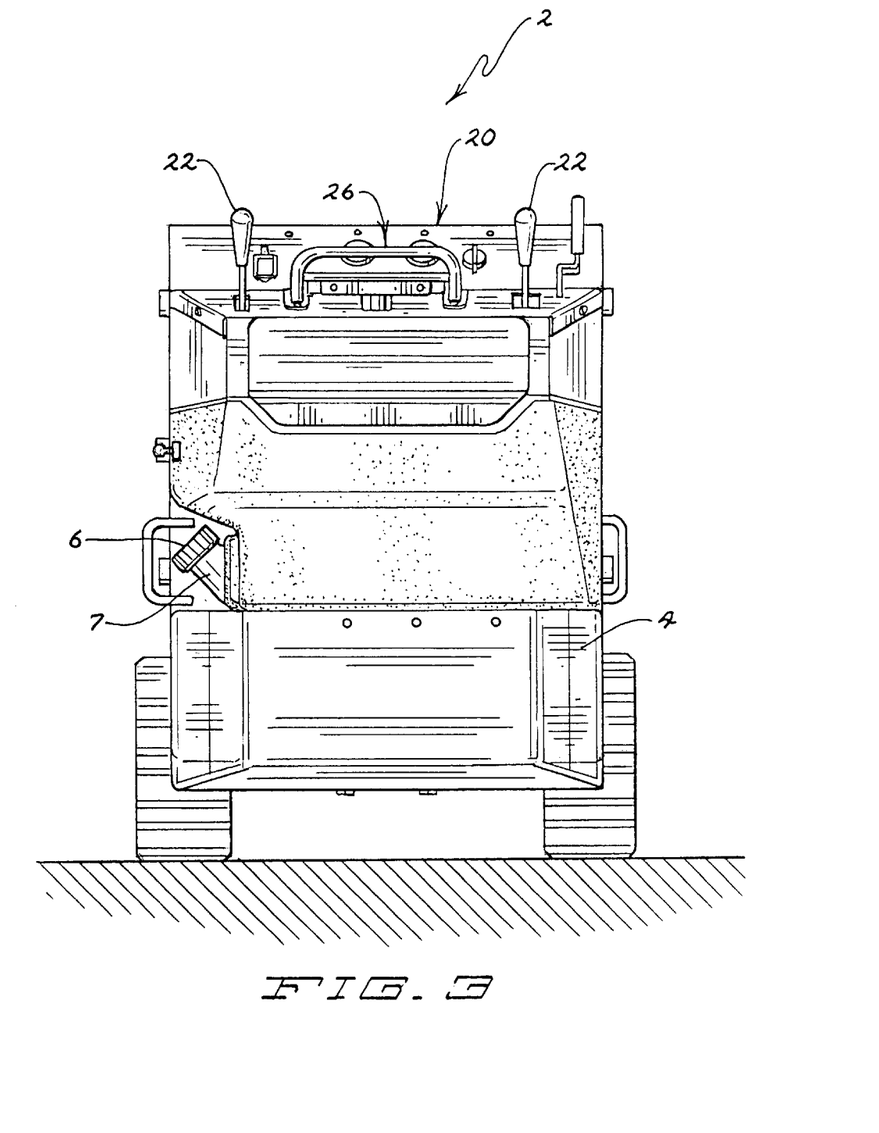
FIG. 3 is a rear elevational view of the loader of FIG. 1.
Figure 4:
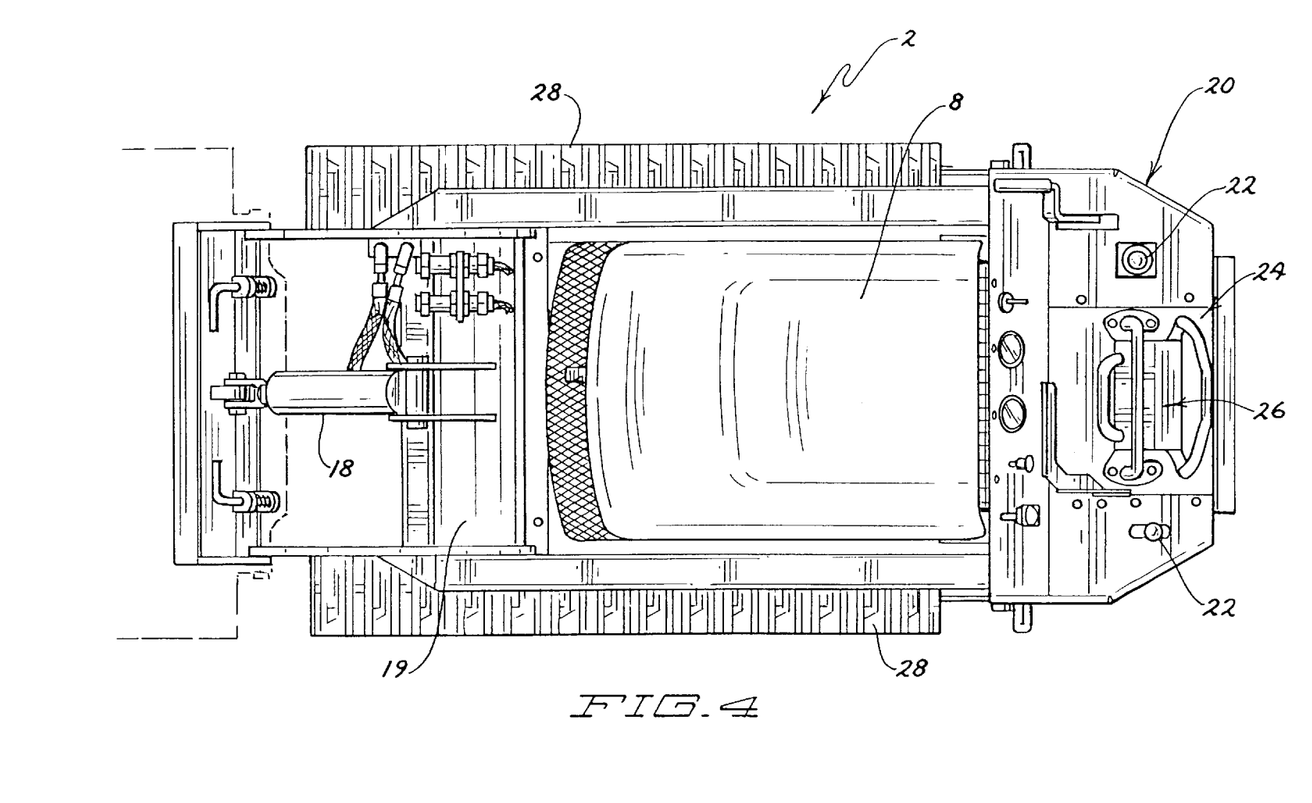
FIG. 4 is a top plan view of the loader of FIG. 1.

A ground grooming or ground working attachment 16 is pivotally connected to the front ends of loader arms 12. As shown in FIGS. 1 and 2, one type of attachment 16 that can be connected to loader arms 12 is a bucket for scooping and carrying dirt. However, many other types of attachments can be connected to loader arms 12 in place of the bucket, such as dozer blades, ground leveling planes, scarifiers, and the like. A bucket is shown as attachment 16 only for illustrative purposes. To ease the task of removing and installing attachments on loader arms 12, various well known quick attachment systems, such as the BOB-TACH system, can be used.

A hydraulic tilt cylinder 18 extends between attachment 16 and a cross-member 19 extending between loader arms 12 to vary the angle of inclination of attachment 16 relative to loader arms 12. Thus, by controlling the vertical position of loader arms 12, and by controlling the angle of inclination of attachment 16 relative to loader arms 12, the operator can use loader 2 to perform various ground grooming and/or ground working operations, depending upon the type of attachment 16 which is coupled to loader arms 12.

A control area 20 is located at the rear of loader 2 adjacent to and extending rearwardly from the upper ends of uprights 10. This control area 20 includes various levers 22 which the operator can use to control the cylinders 14 that pivot loader arms 12 and the tilt cylinder 18 that tilts attachment 16 on loader arms 12. In addition, control area 20 also includes a control system 24, including a movable control handle 26, that the operator can grip to control a traction system 27 that drives loader 2 in forward or reverse. Control system 24 will be described in greater detail hereafter in conjunction with a description of FIGS. 8–11.

As is clearly illustrated in FIG. 1, the operator is not carried by and does not ride on loader 2 itself. Instead, the operator walks behind loader 2 during operation in a manner similar to that of a walk-behind lawn mower. Control area 20 of loader 2, and control system 24 provided in control area 20, are positioned at a convenient height to be reached and gripped by a standing operator. In addition, the pivoting of loader arms 12 to the upper ends of rear uprights 10, which uprights are positioned proximate to and immediately in front of control area 20, helps provide the standing operator with good sight lines down to the attachment 16 carried on the front of loader arms 12.

Alternatively, if so desired, the operator could be carried on loader 2 in a seated or standing position.

Traction system 27 of this invention is a tracked system which comprises left and right drive tracks 28. Each drive track 28 is an endless, flexible track that is looped or entrained around a rear drive support member 30 and a front idler support member 32. Each drive track 28 has inwardly extending drive lugs 34 that engage in apertures or openings in at least rear drive support member 30.

Rear drive support member 30 for each track 28 is driven by a hydraulic motor 31 coupled thereto or by any other suitably driven motor or drive connection. The rotation of rear drive support member 30 will move drive track 28 through drive lugs 34 on track 28 being driven by rear drive support member 30. Motor 31 powering rear drive support member 30 can rotate in forward or reverse directions to propel loader 2 forwardly or in reverse. Each rear drive support member 30 is powered by its own independent drive motor 31 so that steering control is achieved by varying the relative rotational speeds of the motors as will be described in more detail hereafter.

Figure 5:
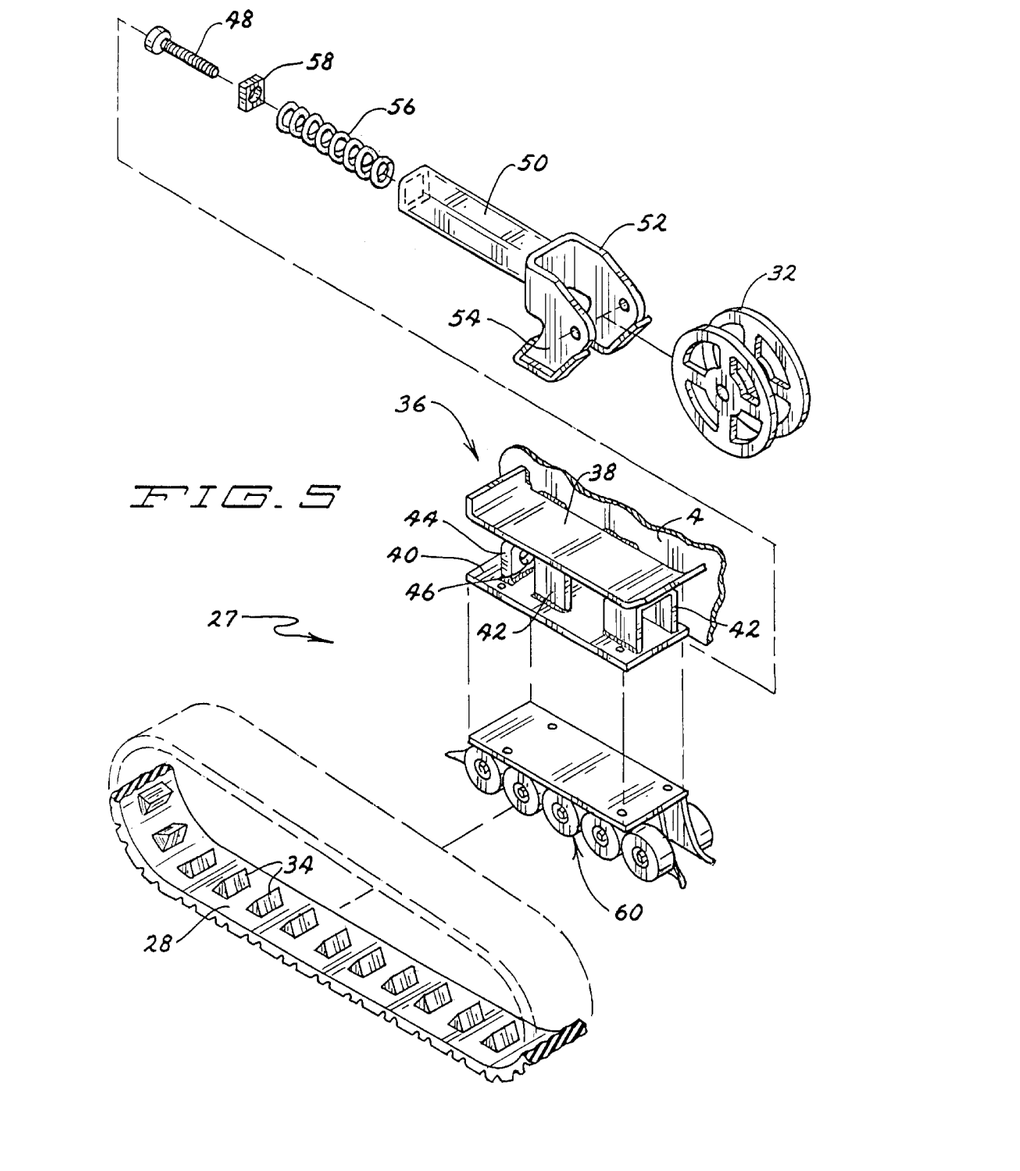
FIG. 5 is a perspective view in exploded form of a portion of one of the drive tracks of the loader of FIG. 1, particularly illustrating the biasing system that yieldably biases the front track support member forwardly.
Figure 6:
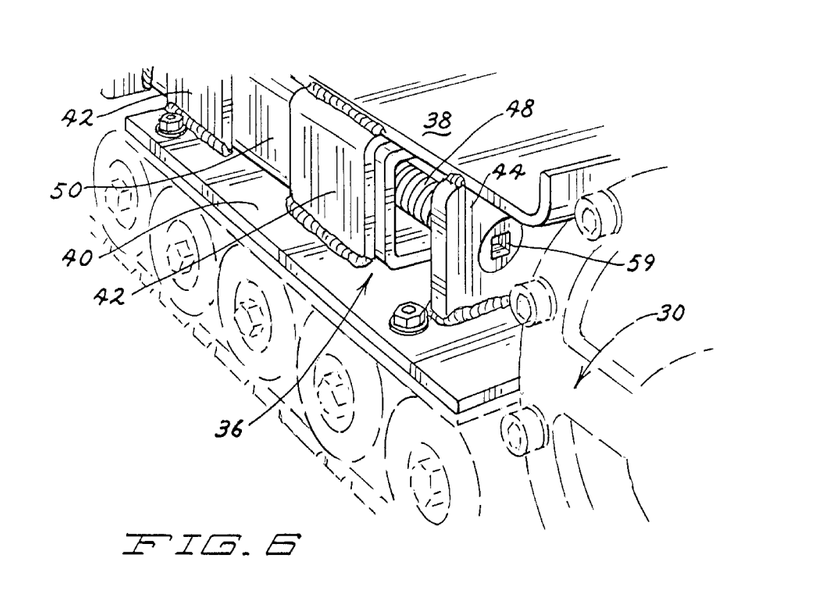
FIG. 6 is a perspective view of the rear end of the biasing system shown in FIG. 5, particularly illustrating the wrench opening used for rotating the adjusting bolt that adjusts the spring force provided by the biasing spring.
Figure 7:
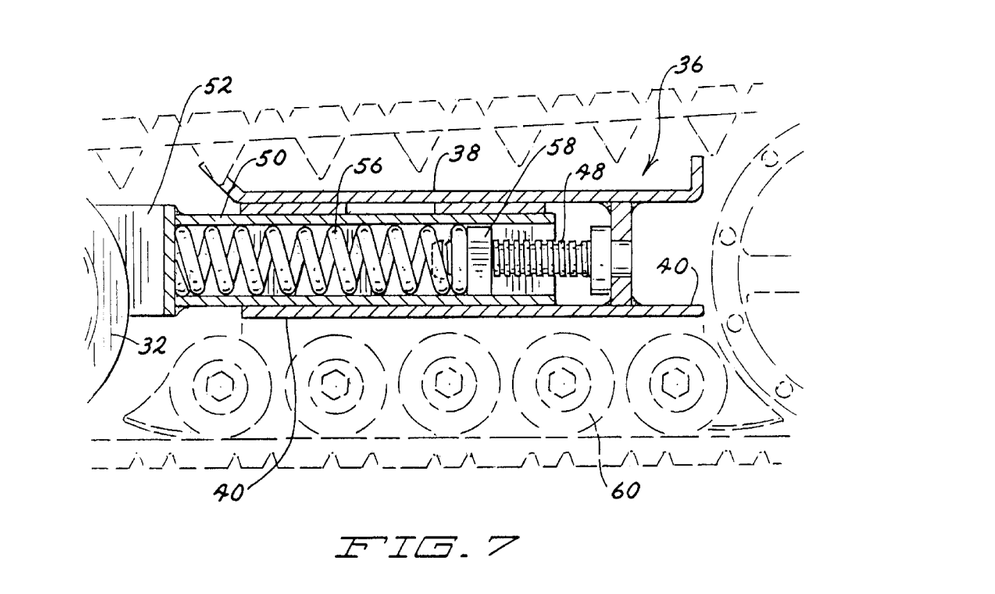
FIG. 7 is a side elevational view of the biasing system shown in FIG. 5.
Figure 8:
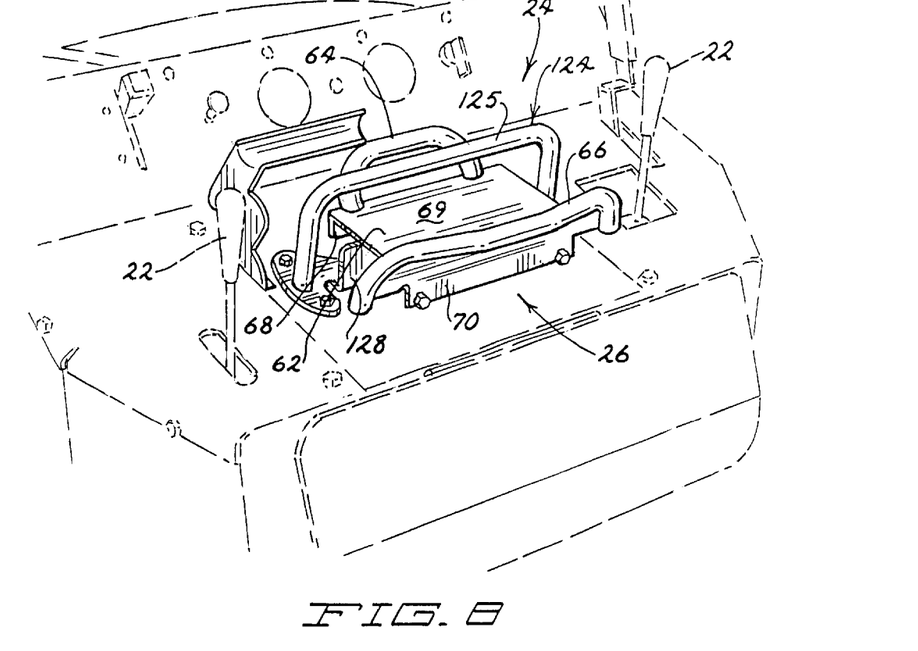
FIG. 8 is a perspective view of a portion of the control area of the loader of FIG. 1, particularly illustrating the control system that operates the tracked traction system of the loader.
Figure 9:
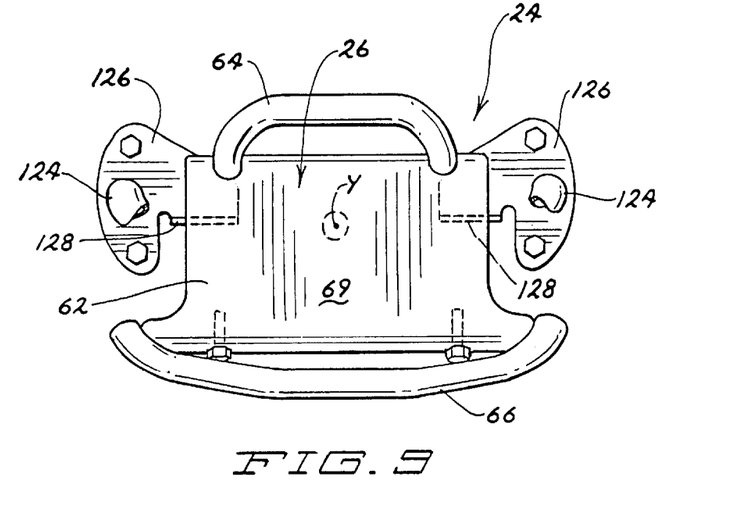
FIG. 9 is a top plan view of a portion of the control system shown in FIG. 8, particularly illustrating both the movable control handle and a fixed grab bar assembly with the middle portion of the grab bar assembly being broken away so as not to obscure the control handle.

Referring now to FIGS. 5–7, tracked traction system 27 of this invention uses a yieldable front idler support member 32. By this it is meant that front support member 32 is spring biased forwardly but can move back against the spring bias. The Applicants have found this feature to be useful in preventing track 28 from becoming detracked when dirt, debris, rocks or the like get caught between drive track 28 and the support members 30, 32, particularly between track 28 and front support member 32. If front support member 32 can move back somewhat towards rear support member 30, track 28 can clear itself of these materials much more easily. Any foreign material that would tend to cause drive track 28 to become detracked can pass around front support member 32 and eventually fall out of the way. Once this foreign material clears itself, the spring bias can reassert itself and move front support member 32 back to its normal position.

In a tracked traction system 27, a maximum back travel is preferably provided for front support member 32, i.e. the amount by which front support member 32 is able to move back towards rear support member 30 has a maximum value. This maximum back travel must be selected so that drive lugs 34 do not disengage the apertures or openings in rear support member 30. In a tracked traction system 27 having 1.5" drive lugs 34, the Applicants have found that a maximum back travel for front support member 32 of 0.5" is effective in allowing tracks 28 to be self-clearing of debris while ensuring that drive lugs 34 remain in driving engagement with rear support member 30.

A channel or slideway 36 is formed on loader frame 4 between the upper and lower runs of each drive track 28. As shown in FIG. 5, slideway 36 comprises upper and lower plates 38 and 40 welded to loader frame 4. Two spaced U-shaped saddles 42 are welded between plates 38, 40 to form a rectangularly shaped slideway 36. Slideway 36 is open at its front and rear ends and includes a rear wall 44 located adjacent the rear end of slideway 36. Rear wall 44 is also welded between the upper and lower plates 38 and 40 and has an opening 46 through which an adjustment bolt 48 passes.

Figure 12:
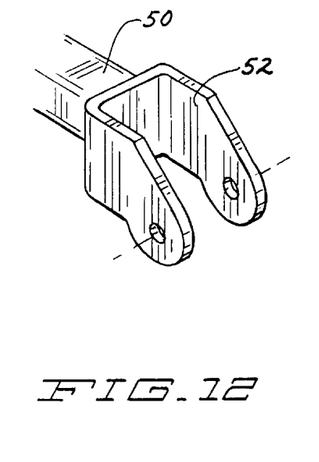
FIG. 12 is a partial perspective view of an alternate embodiment of the slide that is part of the biasing system for yieldably biasing the front track support member.

A rectangular slide 50 is sized to be slidably received in slideway 36. Slide 50 comprises a hollow tube having an open rear end and a closed front end which carries a U-shaped yoke 52. Front track support member 32 is rotatably journalled in U-shaped yoke 52 on the front of slide 50. U-shaped yoke 52 has downwardly depending feet 54 which extend down and engage against the top side of the lower run of drive track 28. Alternatively, as shown in FIG. 12, downwardly depending feet 54 can be deleted from yoke 52 if so desired.

A biasing spring 56 is inserted into the hollow tube of slide 50 to bear against slide 50 and force slide 50 forwardly. The rear end of biasing spring 56 abuts against a nut 58 carried on adjustment bolt 48 that is inserted into the rear end of slideway 36. After nut 58 has been adjusted to a particular position, nut 58 remains fixed on bolt 48 to serve as a fixed abutment for the rear end of spring 56. Thus, whatever bias is provided by spring 56 will move slide 50 forwardly relative to the channel to force front support member 32 into engagement with the front of drive track 28 and thereby properly support drive track 28. However, as noted earlier, should debris or foreign material be caught between drive track 28 and front support member 32 which might tend to detrack drive track 28, front support member 32 can move rearwardly against the bias of spring 56 to allow the debris or foreign material to clear. This is a major advantage in an outdoor equipment unit, such as the walk-behind loader 2 disclosed herein, which operates in relatively dirty, debris laden environments.

The biasing force provided by spring 56 can be quickly and easily released by rotating adjustment bolt 58 to move the position of nut 58 rearwardly on bolt 48. The rear end of adjustment bolt 48 carries an opening 59 in which a wrench can be received to rotate bolt 48, the wrench opening 59 being easily accessible from the open rear end of slideway 36. Wrench opening 59 can be shaped to receive a square wrench or an Allen wrench. See FIG. 6. When nut 58 is backed off, slide 50 will move or can be moved rearwardly far enough to allow track 28 to be taken off support members 30, 32.

However, nut 58 is normally located on bolt 48 during operation of loader 2 at a position which provides sufficient biasing force on slide 50 to keep track 28 in place on support members 30, 32. In addition, the location of nut 58 controls the maximum desired back travel for slide 50. For example, if the maximum back travel is desirably 0.5", then nut 58 is located at a spot on bolt 38 in which spring 56 becomes fully compressed, i.e. becomes solid, after slide 50 has moved back 0.5" from its normal forward position.

The yieldable front support member 32 described above is used on both the left and right drive tracks 28 of loader 2. In addition, the slideway 36 provided on frame 4 of loader 2 for receiving slide 50 also forms a convenient spot for attaching a set of bogey wheels 60 that help guide and support drive track 28. The bogey wheel set 60 is simply bolted to lower plate 40 of slideway 36.

Referring now to FIGS. 8–11, control system 24 for controlling traction system 27 operates by controlling the pressurized hydraulic fluid flow to the individual drive motors 31 for tracks 28. To propel loader 2 forwardly or in reverse in a straight path, the drive motors for tracks 28 are operated simultaneously at the same speed either in a forward or reverse direction, respectively. To turn loader 2, the drive motors for tracks 28 are operated simultaneously but at different speeds for some turns or even in different directions for much sharper turns.

For example, drive motors 31 will both rotate in a forward direction and at the same speed when loader 2 is moving forwardly in a straight path. To steer or turn loader 2 out of this straight path, one drive motor 31 for track 28 on one side of loader 2 will be caused to rotate faster or slower than drive motor 31 for the other track. This relative difference in the speed of drive motors 31 causes loader 2 to turn. To effect a very sharp turn, one drive motor 31 can be stopped relative to the other motor or can even be operated in the reverse direction. In this situation, namely where one drive motor is operating at a high rate of speed while the other drive motor is stopped or reversed, a sharp pivot type turn will be made by loader 2.

Control system 24 of this invention comprises a single movable control handle 26 which effects forward and reverse operation and steering of traction system 27. Using a single control handle 26 for operating traction system 27 is advantageous because it leaves the operator's other hand free for operating other controls on loader 2, such as the levers 22 used to operate loader arms 12 or the attachments 16 coupled to loader arms 12.

Figure 11:
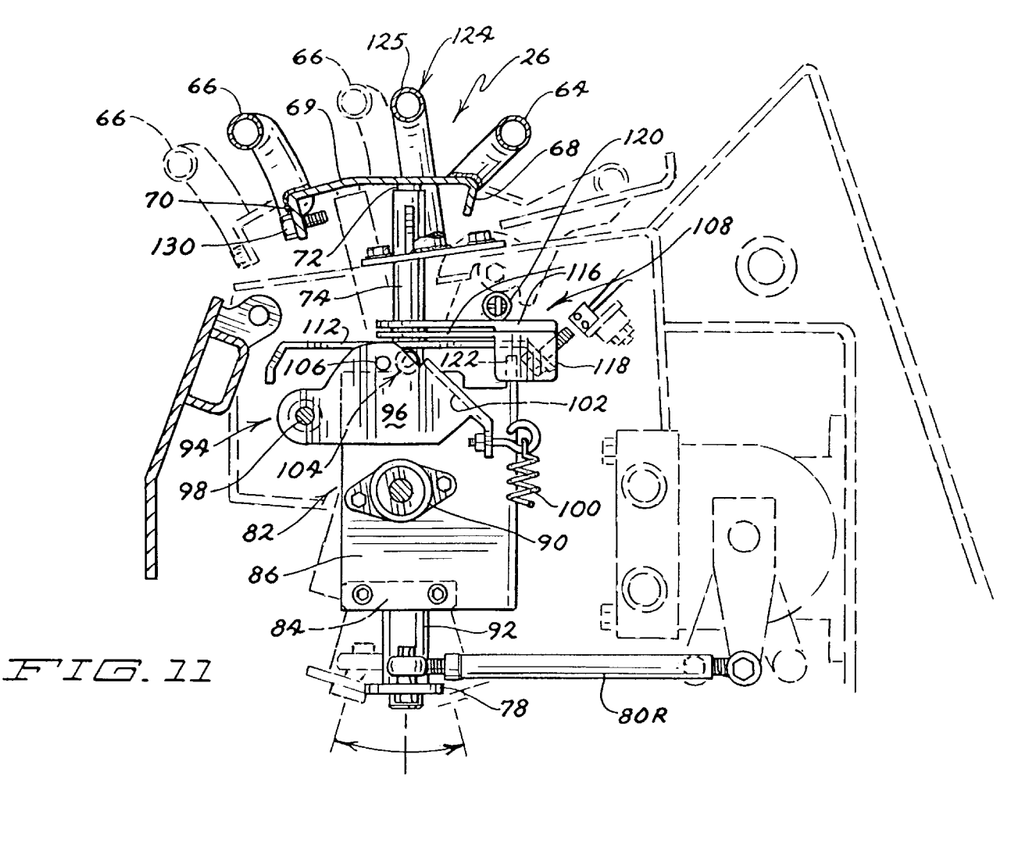
FIG. 11 is a side cross-sectional view of the control system of FIG. 8, the control system being shown in solid lines in its centered, neutral position and with the two phantom line illustrations of the rear hand grip representing the position of the rear hand grip in a maximum forward speed condition and a maximum rearward speed condition, respectively.

Control handle 26 comprises a mounting plate 62 which carries two hand grips 64 and 66. Referring to FIG. 11, mounting plate 62 has a generally U-shaped cross-sectional configuration formed by a front wall 68, a top wall 69, and a rear wall 70. Top wall 69 is not entirely planar, but includes a front section and a rear section that lie in slightly different planes. As shown in FIG. 11, the rear section of top wall 69 is slightly downwardly inclined relative to the front section of top wall 69. In addition, mounting plate 62 includes a generally centrally located hollow sleeve 72 that extends downwardly from the underside of top wall 69.

Two hand grips 64 and 66 are carried on top wall 69 extending upwardly therefrom. A front hand grip 64 extends upwardly and forwardly from the front section of top wall 69. Similarly, a rear hand grip 66 extends upwardly and rearwardly from the rear section of top wall 69. See FIG. 9. Each hand grip 64 and 66 is U-shaped having a horizontal cross-member 67 which is joined to top wall 69 by downwardly extending legs. Front hand grip 64 is somewhat narrower than rear hand grip 66.

The downwardly extending hollow sleeve 72 on the hand grip mounting plate 62 is telescopically received over the upper end of a control shaft 74. The upper end of control shaft 74 includes openings 76 for receiving pins or bolts (not shown) for bolting control shaft 74 to mounting plate sleeve 72. The lower end of control shaft 74 includes a generally horizontal flange 78 whose ends extend outwardly from the axis y of control shaft 74. The control linkages 80 that control the pumps or valves that supply fluid to each of drive motors 31 for tracks 28 are secured to opposite ends of flange 78 on control shaft 74. Thus, a linkage 80l for controlling one drive motor is secured to the left end of flange 78 and the linkage 80r for controlling the other drive motor is secured to the right end of flange 78.

Figure 10:
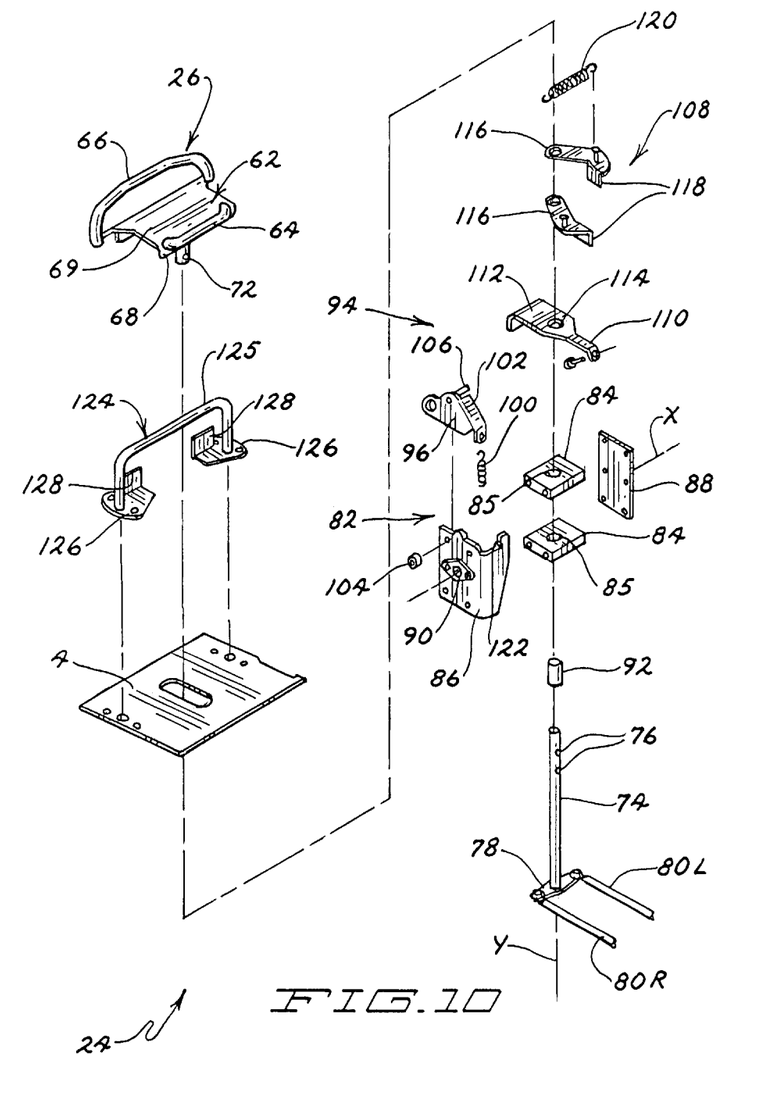
FIG. 10 is a perspective view in exploded form of the various components of the control system of FIG. 8.

Control shaft 74 pivots about a generally horizontal pivot axis indicated as x in FIG. 10. In addition, control shaft 74 is also free to rotate about its own, generally vertical axis indicated as y in FIG. 10. Since control handle 26 is fixed to control shaft 74, control handle 26 also pivots about the x axis and rotates about the y axis along with control shaft 74.

Figure 13:
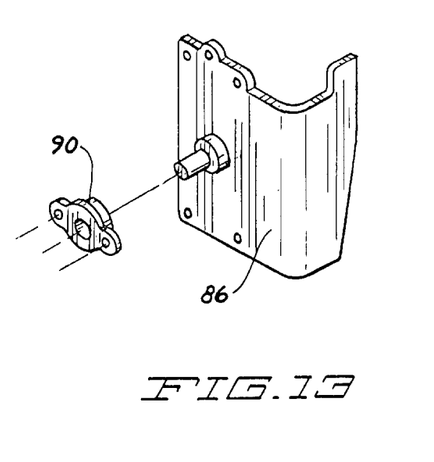
FIG. 13 is a partial perspective view of an alternate embodiment for the pivot structure that pivotally journals the control system bushing member for rotation about the x axis.

This motion is accomplished by forming a bushing member 82 from two, vertically spaced, horizontal bushing blocks 84 which are clamped between two side plates 86 and 88. Each side plate 86 and 88 includes a bearing 90 which receives a stub shaft (not shown in FIG. 10) carried on frame 4 of loader 2. The stub shafts lie along the horizontal pivot axis x for control shaft 74. Alternatively, as shown in FIG. 13, the location of the stubs shafts and bearings could be reversed. Each bearing 90 could be carried on frame 4 of loader 2 and each stub shaft 91 could be attached to one of the side plates 86 and 88.

Control shaft 74 passes upwardly through bushing member 82 and specifically through aligned central bores 85 in bushing blocks 84. However, since the stub shafts which journal bushing member 82 do not directly pass through control shaft 74, control shaft 74 is still free to rotate about the vertical axis y within central bores 85 in bushing blocks 84. A spacer 92 surrounds the lower end of control shaft 74 between the bottom of bushing member 82 and flange 78.

A first return to neutral system 94 is provided for ensuring that the control shaft 74/control handle 26 combination automatically returns to a neutral position with respect to pivoting about the horizontal x axis. This first return to neutral system 94 includes a centering lever 96 that is pivotally mounted on loader frame 4 for pivoting motion about a substantially horizontal pivot rod 98. Referring again to FIG. 11, a first return spring 100 extends between centering lever 96 and loader frame 4. Centering lever 96 carries an inclined ramp 102 that extends to one side of centering lever 96 towards bushing member 82.

Left side plate 86 of bushing member 82 has an upwardly extending tab that mounts a roller 104. In the neutral position, roller 104 is positioned adjacent the top end of ramp 102 on centering lever 96. See FIG. 11. If control shaft 74 pivots about the axis x in a clockwise direction, corresponding to a forward motion of control handle 26, roller 104 pushes forwardly against ramp 102 to pivot centering lever 96 in a counter-clockwise direction about its pivot rod 98. This elongates spring 100 to create an opposed biasing force on centering lever 96. Thus, when the operator releases control handle 26, this biasing force will rotate centering lever 96 back in the clockwise direction, thus pushing back on roller 104 carried on left side plate 86 of bushing member 82, to return control shaft 74 to its neutral position.

The same thing happens when control shaft 74 pivots about the axis x in a counter-clockwise direction corresponding to a reverse motion of control handle 26. In this case, roller 104 on left side plate 86 of bushing member 82 catches or engages against an inwardly protruding pin or bolt 106 on centering lever 96 to again cause centering lever 96 to pivot in a counter-clockwise direction about its pivot rod 98. This causes the same elongation of spring 100 as described earlier. Thus, when control handle 26 is released, the spring force on centering lever 96 will return control shaft 74 to its neutral position. Thus, a pivoting motion of control shaft 74 about the x axis, whether such pivoting motion is clockwise or counter-clockwise, creates the same counter-clockwise rotation of centering lever 96 that results in elongation of spring 100 that provides the return to neutral biasing force. This force can effectively act on control shaft 74 upon release of control handle 26 by the operator.

A second return to neutral system 108 is provided for ensuring that the control shaft 74/control handle 26 combination automatically returns to a neutral position with respect to pivoting about the vertical y axis of control shaft 74. This second return to neutral system 108 includes a forwardly extending, return finger 110 which is connected to a plate 112 that includes an aperture 114 through which control shaft 74 passes. Plate 112 is fixed to control shaft 74 to rotate with control shaft 74 about the y axis. Thus, as control handle 26 and control shaft 74 rotate about the y axis, return finger 110 swings in an arc to one side or the other of its neutral position.

The second return to neutral system also includes two return arms 116 that are carried on control shaft 74 immediately above plate 112 and return finger 110. Plate 112 and return arms 116 are stacked on top of one another. However, unlike plate 112 and finger 110 which are connected to control shaft 74 to rotate with control shaft 74, return arms 116 are not integrally connected to control shaft 74. Rather, return arms 116 have circular openings which receive control shaft 74 such that return arms 116 can rotate relative to control shaft 74. Each return arm 116 has a downwardly protruding tab 118 on the front end thereof. A second return spring 120 is connected between return arms 116 and biases return arms 116 towards one another.

Left side plate 86 of bushing member 82 includes an upwardly extending stop 122 that extends between return arms 116. This stop 122 spaces return arms 116 apart an amount which is sufficient to allow return finger 110 to be received between tabs 118 on return arms 116. In other words, one tab 118 extends down past one side of return finger 110 and the other tab 118 extends down past the other side of return finger 110. When the operator rotates control shaft 74 about the y axis, return finger 110 will push on one of the tabs 118 to rotate return arm 116 that carries that tab away from the other return arm which remains stationary against stop 122. This further elongates biasing spring 120. When the operator lets go of control shaft 74, return arm 116 that has been moved will rotate back towards the other return arm 116 as a result of the force provided by biasing spring 122. This will move return finger 110, and hence control shaft 74 to which return finger 110 is attached via plate 112, to a neutral position relative to the y axis.

The return to neutral operation described above holds true whether one rotates control shaft 74 in one direction or the opposite direction relative to the y axis. One return arm 116 will always be moved by return finger 110 and the other return arm 116 will remain stationary. Which return arm 116 moves and which remains stationary simply depends on the direction in which control shaft 74 is rotated. In any event, when the operator releases control handle 26 such that control shaft 74 is free to rotate back to its neutral position, whichever return arm 116 has been moved swings back to accomplish the return to neutral function.

In control system 24 of FIGS. 8–11, the first return to neutral system 94 acts between control shaft 74 and loader frame 4 to accomplish a return to neutral relative to pivoting about the horizontal x axis. The second return to neutral system 108 acts between control shaft 74 and bushing member 82 which is also carried on control shaft 74. Thus, the second return to neutral system 108 is entirely carried on control shaft 74 so that it moves with control shaft 74 as control shaft 74 pivots about the horizontal x axis. Accordingly, the second return to neutral system 108 will work as described earlier regardless of the degree or amount which control shaft 74 may have been pivoted about the x axis.

Besides the previously described movable control handle 26, control system 24 of this invention includes a stationary grab bar assembly 124 that is bolted to a portion of frame 4 of loader 2. This grab bar assembly 124 includes a grab bar 125 that is positioned generally midway between the front and rear hand grips 64 and 66 on control handle 26 and is parallel to hand grips 64 and 66. The mounting flanges 126 which are used to bolt grab bar assembly 124 to frame 4 of loader 2 include two laterally spaced, upwardly extending stops 128. These stops 128 are positioned to engage the front and rear walls 68 and 70 of mounting plate 62 for hand grips 64 and 66 to limit the maximum rearward and forward motion of control handle 26.

In addition, to provide some adjustability in the maximum amount of forward motion that is allowed for control handle 26, rear wall 70 of mounting plate 62 includes forwardly extending threaded bolts 130. It is these bolts 130 which actually engage stops 128 on grab bar assembly 124 to limit forward motion of control handle 26. The position at which this occurs can obviously be adjusted by turning bolts 130 inwardly or outwardly relative to rear wall 70 of mounting plate 62. Bolts 130 should be adjusted so that the hydraulic pumps supplying the hydraulic drive motors that drive tracks 28 do not bottom out in their strokes. In addition, bolts 130 can be individually adjusted so that loader 2 tracks straight when it is supposed to be travelling in a straight path. Finally, the amount of distance between stops 128 and front wall 68 of mounting plate 62 should be selected to keep the maximum reverse speed of loader 2 to a safe level.

Typically, the maximum forward speed of loader 2 would be greater than the maximum rearward speed of loader 2. This is depicted in FIG. 11 by the two phantom line illustrations of rear hand grip 66. Note that hand grip 66 in its forwardmost phantom line position where it is adjacent grab bar 125, corresponding to maximum forward speed, has moved farther from neutral than it does when in its rearwardmost phantom line position, corresponding to maximum reverse speed.

By now, it should be apparent how control system 24 of this invention operates. Normally, when loader 2 is not being propelled, control handle 26 has its centered, neutral position, as shown in solid lines in the drawings, with respect to the x and y axes. If the operator wishes to propel loader 2 forwardly, all the operator need do is to grab control handle 26 and push forwardly on control handle 26 to rotate control handle 26, and control shaft 74, in a clockwise direction in FIG. 11 about the horizontal pivot axis x. In accomplishing this forward pushing motion on control handle 26, the operator can easily put the fingers of one hand on grab bar 125 and position the palm of that hand on rear hand grip 66 and then squeeze that hand closed. This action will push on rear hand grip 66 to push control handle 26 forwardly.

A simple push forwardly on control handle 26, without also twisting or rotating control handle 26 about the y axis, will effect forward motion of loader 2 in a straight line path. If the operator simultaneously twists control handle 26 while the operator is pushing it forwardly, this twisting motion will cause control handle 26 to simultaneously rotate about the y axis. This will cause loader 2 to turn or steer in one direction or the other depending upon the direction of the twisting motion. The amount or sharpness of the turn depends on the degree of the twisting motion.

Control system 24 acts much the same in achieving reverse motion of loader 2, except that the operator would now position at least one hand bridging the gap between grab bar 125 and front hand grip 64. Now, the palm of the operator's hand would rest on grab bar 125 and the fingers of the operator's hand would reach forwardly to grip front hand grip 64. When the operator squeezes that hand closed, front hand grip 64 moves back towards fixed grab bar 125, to effect pivoting of control handle 26 in a counter-clockwise direction about the horizontal x axis.

Reverse motion of loader 2 can also be easily achieved simply by grabbing rear hand grip 66 and pulling rearwardly on hand grip 66. In addition, the operator can also turn loader 2 simply by placing the operator's hand on rear hand grip 66 and by laterally pulling rear hand grip 66 towards one side or the other, thereby rotating control handle 26 about control shaft axis y. Pulling rearwardly on rear hand grip 66 is very effective in rotating control handle 26 about the x axis and a lateral pull on rear hand grip 66, or a lateral pull on front hand grip 64 for that matter, is effective in rotating control handle 26 about control shaft axis y. This is especially true since hand grips 64 and 66 are offset in front of and to the rear of control shaft axis y, respectively. See FIG. 9 which illustrates the fore and aft offsets between control shaft axis y and front hand grip 64 and rear hand grip 66. Each offset thereby provides a moment or lever arm for converting a pull on either front or rear hand grip 66 into rotating motion of control handle 26.

Regardless of whether forward or reverse motion of loader 2 has been selected by the operator, and regardless of whether loader 2 is being turned, whenever the operator lets go or releases pressure on control handle 26, control handle 26 is reliably returned to neutral to deactivate traction system 27 and cause loader 2 either to come to a stop or to at least end a previously initiated turn. For example, if control handle 26 has been rotated about the y axis to a position that is not centered, releasing control handle 26 causes whichever return arm 116 which has been rotated to swing back towards the other return arm, thus causing control handle 26 to rotate back to its neutral, centered position relative to the y axis. This will happen even if the operator continues to keep control handle 26 in a rotated position about the x axis, namely the return to neutral system 108 for the y axis works in any pivotal position of control handle 26 relative to the x axis.

Thus, assume the operator is driving loader 2 forwardly and momentarily twists control handle 26 to turn loader 2.

As soon as the turn is completed, the operator can release the twisting motion of the operator's hand from control handle 26 but can still keep control handle 26 pushed forwardly to keep driving loader 2 forwardly. When the twisting motion of the operator's hand is released, the second return to neutral system 108 will automatically center control handle 26 with respect to the y axis, even though control handle 26 is still rotated forwardly about the x axis.

Control system 24 provides a major advantage over similar prior art control systems. In the prior art, at the conclusion of a turn of the unit, it is often necessary for the operator to manipulate the controls to steer the unit back into straight line travel. The unit does not necessarily resume straight line travel on its own. Thus, the operator must pay attention at the conclusion of each turn to properly resume straight line travel and the skill of the operator becomes a factor in resuming such straight line travel. In the hands of an unskilled or distracted operator, the unit may weave back and forth at the end of a turn before the operator can get it properly straightened out.

However, control system 24 of this invention avoids this disadvantage. At the conclusion of any turn, all the operator must do is to let up on the twisting motion of the operator's hand. Because the second return to neutral system 108 is carried by and moves with control shaft 74, the second return to neutral system 108 will act as soon as the twisting motion of the operator's hand is released to return control shaft 74 to neutral with respect to rotation about the y axis. Thus, if the operator simply releases the twisting motion on control handle 26 after a turn of loader 2 is completed, loader 2 will automatically resume straight line travel without the operator having to steer it back to straight, i.e. without the operator having to jockey control handle 26 back and forth until straight line motion resumes. Thus, control system 24 of this invention is much easier to use than prior art control systems, particularly for operators who may be relatively inexperienced in operating loader 2.

The first return to neutral system 94 used for the x axis is just as reliable as is the second return to neutral system 108. All the operator need do is to completely release the pressure from control handle 26 either by taking the operator's hands completely off control handle 26 or by letting control handle 26 slide all the way back through the operator's hands. As soon as the operator does so, centering lever 96 is free to act on bushing member 82 carried on control shaft 74 to cause control shaft 74 to be returned to its centered, neutral position.

Grab bar assembly 124 eases the task of holding control handle 26 in an advanced position against the bias provided by the first and second return to neutral systems 94 and 108. Because the operator's hands can bridge the distance between grab bar 125 and either of the hand grips 64 and 66, grab bar assembly 124 also helps the operator control traction system 27 more precisely. The operator can feather the speed up or down simply by squeezing his hand slightly more or letting up slightly. Accordingly, grab bar assembly 124 in concert with front and rear hand grips 64 and 66 eases the task of controlling traction system 27.

In addition to providing some leverage to the operator in pushing control handle 26 forwardly, grab bar assembly 124 serves as a reference for the operator's hand to help the operator keep control handle 26 in a relatively constant position during operation of loader 2. Loader 2 can tilt or move independently of the orientation of the operator. For example, loader 2 can encounter a sloped terrain while the operator is still on level ground. In this situation, control handle 26 will tend to move suddenly in the operator's hand as loader 2 moves relative to the operator.

However, by resting a portion of the operator's hand on grab bar 125 while operating control handle 26, the operator's hand has some reference point on loader 2 other than for handle 26. This helps the operator keep steady pressure on control handle 26 even though loader 2 may itself be pivoting up and down and from side to side relative to the operator. Thus, when the operator walks behind loader 2 as shown herein, the presence of grab bar assembly 124 helps the operator to more smoothly drive loader 2 by avoiding or diminishing jerky motions on control handle 26 induced merely by the independent motion of loader 2. In addition, grab bar assembly 124 helps pull the operator along with loader 2, thus letting the operator more easily walk behind loader 2 at the same speed as loader 2.

If loader 2 is constructed to carry the operator thereon in a seated or standing position, the grab bar assembly 124 is not as important in providing a reference point for the operator since the operator also simultaneously experiences the same terrain following motions as loader 2. However, even in this situation, the presence of grab bar assembly 124 is still preferred. Nonetheless, grab bar assembly 124 could be deleted if so desired in loaders 2 both designed to carry the operator or in the walk-behind loader 2 shown herein. Deleting grab bar assembly 124 in the walk-behind loader 2 shown herein simply makes it somewhat more difficult for the operator to keep control handle 26 in a constant position if loader 2 is moving over varying, uneven terrain.

Figure 14:
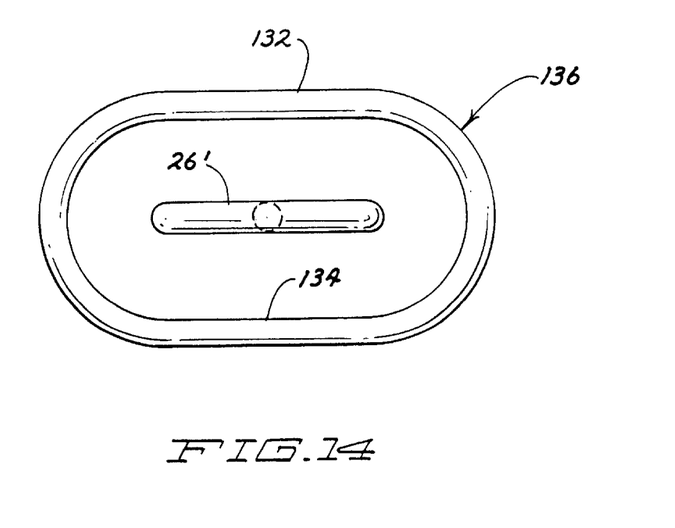
FIG. 14 is a diagrammatic top plan view of an alternate embodiment of the movable control handle and the fixed grab bar assembly.

Control handle 26 has been shown herein as comprising front and rear hand grips 64 and 66 with grab bar 125 comprising an intermediate member located between these two hand grips. However, another alternative embodiment of a control handle/grab bar assembly is shown in FIG. 14. In this embodiment, control handle 26 comprises a single T-bar control handle 26' placed between front and rear grab bars 132 and 134 fixed to frame 4. In this configuration, the grab bars 132 and 134 comprise the front and rear members and the control handle is the intermediate member that is located between the front and rear members. In fact, the front and rear grab bars 132 and 134 could simply be the front and rear sides of an enclosed circle or rectangularly shaped grab bar forming ring 136 that surrounds T-bar control handle 26'. In this embodiment, T-bar control handle 26' is moved fore and aft, and is twisted side-to-side, within the grab bar forming ring 136.

Various modifications of this invention will be apparent to those skilled in the art. For example, control system 24 is effective for controlling traction systems 27 having independent left and right drive motors regardless of whether the ground engaging, traction members comprise tracks 28 or wheels. In addition, control system 24 is useful on and can be used in conjunction with outdoor equipment units other than for a compact utility loader 2, such as walk-behind mowers, aerators, etc. The first return to neutral system 94 and the second return to neutral system 108 include at least one first return spring 100 and at least one second return spring 120, but obviously each return to neutral system could utilize more than one return spring if so desired, i.e. there could be multiple return springs 100 or multiple return springs 120. Thus, the scope of the invention shall be limited only by the appended claims.

We claim:

1. A walk-behind loader, which comprises:
 (a) a walk-behind frame
 (b) a ground grooming or working attachment carried on the frame;

(c) a source of power carried on the frame;

(d) a traction system carried on the frame for propelling the frame in forward and reverse directions, the traction system being powered by the power source;

(e) the traction system comprising left and right endless drive tracks carried on the frame, wherein each drive track is entrained around rotatable front and rear support members, and wherein the front support member of each drive track is yieldably carried on the frame to be able to move towards the rear support member during operation of the traction system by biasing means comprising;

(i) a substantially U-shaped yoke having side walls joined together by a rear wall, the front support member being rotatably journalled between the side walls of the yoke;

(ii) a slide secured to the rear wall of the yoke and extending rearwardly from the yoke, the slide comprising a hollow tube having a front end attached to the rear wall of the yoke and an open rear end to provide access to the interior of the slide through the open rear end of the slide;

(iii) a slideway on the frame with the slideway having an open front end and a rear end, wherein the slide is inserted into the slideway through an open front end of the slideway for movement of the slide in a fore-and-aft direction on the frame;

(iv) a spring carried inside the hollow tube of the slide and an abutment positioned inside the hollow tube of the slide generally proximate to the rear end of the hollow tube, the spring having a rear end in engagement with the abutment and the spring having a front end acting operatively against the rear wall of the yoke such that the spring has a spring bias that pushes the yoke and the front support member forwardly relative to the slideway and relative to the rear support member to tension the drive track;

(v) a shaft rotatable on a rear wall of the slideway with the rear wall of the slideway being generally proximate to the rear end of the slideway, wherein the shaft has a rear end and a forwardly extending elongated shank, the forwardly extending elongated shank of the shaft extending forwardly into the hollow tube of the slide with the shank of the shaft passing through the open rear end of the hollow tube and with the shank of the shaft being connected to the abutment located inside the hollow tube while the rear end of the shaft is located exteriorly of the hollow tube; and (vi) wherein the rear end of the slideway is configured to permit access to the rear end of the shaft from the rear end of the slideway to permit an operator to selectively apply torque to the shaft to thereby move the abutment inside the hollow tube in a fore-and-aft direction to selectively vary the spring bias provided by the spring.

2. The walk-behind loader of claim 1, wherein the ground grooming or working attachment is releasably coupled to the frame.

3. A walk-behind loader, which comprises:

(a) a frame having a front and a rear and a pair of laterally spaced uprights at the rear of the frame;

(b) an internal combustion engine carried on the frame enclosed beneath a hood or shroud;

(c) left and right endless drive tracks carried on the frame for propelling the frame in forward and reverse directions, the drive tracks being powered by the internal combustion engine;

(d) left and right loader arms pivotally connected to upper ends of the left and right uprights, respectively, wherein the loader arms extend forwardly and downwardly from the pivotal connections of the loader arms to the uprights to terminate in front ends that extend over the front of the frame, the loader arms having a lowermost position in which the front ends of the loader arms are generally adjacent the ground with the loader arms capable of being raised into elevated positions in which the front ends of the loader arms are spaced further above the ground than in the lowermost position of the loader arms, and wherein the loader arms are configured with an open space between the loader arms which open space is large enough to permit the loader arms to fit down around and receive therebetween at least an upper portion of the hood or shroud of the internal combustion engine when the loader arms are in their lowermost position, the open space between the loader arms providing substantially unobstructed viewing towards the front in elevated positions of the loader arms when the open space is raised in front of an operator's face;

(e) a ground grooming or working attachment pivotally connected to the front ends of the loader arms;

(f) at least one actuator extending between the loader arms and the frame for pivoting the loader arms upwardly and downwardly relative to the frame about the pivotal connection of the loader arms to the frame;

(g) at least one actuator extending between the loader arms and the attachment for pivoting the attachment relative to the loader arms; and (h) a control system positioned at the rear of the frame and comprising a control handle configured to be gripped and manipulated by a standing operator walking behind the frame during operation of the loader, wherein the control system is located sufficiently close to the rear of the frame and the rear of the frame is configured to permit the standing operator walking behind the frame to comfortably reach and operate the control system with the operator's arms being bent at the elbow.

4. The walk-behind loader of claim 3, wherein each drive track is powered by its own separate drive motor.

5. The walk-behind loader of claim 3, wherein the ground grooming or working attachment is releasably coupled to the frame.

6. The walk-behind loader of claim 3, wherein the upper portion of the hood or shroud of the internal combustion engine has a profile that is higher towards the rear of the frame and is lower towards the front of the frame to help prevent obstructing the view of the standing operator towards the front of the frame.

7. The walk-behind loader of claim 3, wherein the at least one actuator extending between the loader arms and the frame is pivotally connected at one end to one of the uprights and at an opposite end to one of the loader arms.

8. The walk-behind loader of claim 7, wherein the at least one actuator extends substantially horizontally between the loader arm and the upright when the loader arms are in the lowermost position.

9. The walk-behind loader of claim 7, wherein a pair of left and right substantially horizontal actuators are provided extending between the loader arms and the frame, wherein the left actuator is pivotally connected at one end to the left upright and at an opposite end to the left loader arm and the right actuator is pivotally connected at one end to the right upright and at an opposite end to the right loader arm.

10. The walk-behind loader of claim 9, wherein the left and right actuators are substantially horizontal when the loader arms are in the lowermost position.

11. The walk-behind loader of claim 9, wherein the left and right actuators comprise hydraulic cylinders with extensible piston rods.

12. The walk-behind loader of claim 1, wherein the shank of the shaft is threaded and the abutment is a threaded nut received on the shank of the shaft, the threaded nut moving back and forth in the fore and aft direction on the threaded shank of the shaft when the shaft is rotated in one direction or the other.

13. The walk-behind loader of claim 12, wherein the nut has a non-circular cross-sectional shape that mates inside a non-circular cross-sectional shape of the hollow tube to move the nut back and forth on the threaded shank of the shaft and to prevent the nut from rotating within the tube as the shaft is rotated.

14. The walk-behind loader of claim 1, wherein the rear end of the shaft has an enlarged head configured to be rotated by a tool.

* * * * *